United States Patent
Kaneko et al.

(10) Patent No.: US 12,415,883 B2
(45) Date of Patent: Sep. 16, 2025

(54) POLYURETHANE RESIN COMPOSITION, CURED PRODUCT, FIBER LAMINATE, AND ARTIFICIAL LEATHER

(71) Applicant: DKS Co. Ltd., Kyoto (JP)

(72) Inventors: Fumiya Kaneko, Kyoto (JP); Takuma Nishimura, Kyoto (JP); Shinya Mizukami, Kyoto (JP)

(73) Assignee: DKS CO. LTD., Kyoto (JP)

( * ) Notice: Subject to any disclaimer, the term of this patent is extended or adjusted under 35 U.S.C. 154(b) by 259 days.

(21) Appl. No.: 18/273,306

(22) PCT Filed: Jan. 31, 2022

(86) PCT No.: PCT/JP2022/003480
§ 371 (c)(1),
(2) Date: Jul. 20, 2023

(87) PCT Pub. No.: WO2022/176581
PCT Pub. Date: Aug. 25, 2022

(65) Prior Publication Data
US 2023/0406996 A1    Dec. 21, 2023

(30) Foreign Application Priority Data
Feb. 17, 2021    (JP) ................. 2021-023107

(51) Int. Cl.
*D06N 3/14*    (2006.01)
*C08G 18/32*    (2006.01)
*C08G 18/34*    (2006.01)
*C08G 18/48*    (2006.01)
*C08G 18/66*    (2006.01)
*C08G 18/75*    (2006.01)

(52) U.S. Cl.
CPC ..... *C08G 18/6692* (2013.01); *C08G 18/3206* (2013.01); *C08G 18/3228* (2013.01); *C08G 18/3234* (2013.01); *C08G 18/348* (2013.01); *C08G 18/4816* (2013.01); *C08G 18/4829* (2013.01); *C08G 18/4833* (2013.01); *C08G 18/4854* (2013.01); *C08G 18/755* (2013.01); *D06N 3/14* (2013.01); *D06N 2203/068* (2013.01)

(58) Field of Classification Search
CPC ...................................................... D06N 3/14
See application file for complete search history.

(56) References Cited

FOREIGN PATENT DOCUMENTS

| EP | 0434467 A2 * | 6/1991 | ............. C08G 18/10 |
|---|---|---|---|
| JP | 2017-119755 A | 7/2017 | |
| WO | WO-2018159359 A1 * | 9/2018 | ......... C08G 18/6659 |
| WO | WO-2020129605 A1 * | 6/2020 | ............... D06N 3/14 |

OTHER PUBLICATIONS

English translation of the International Search Report for International Application No. PCT/JP2022/003480, dated Mar. 15, 2022.
English translation of the Written Opinion of the International Searching Authority for International Application No. PCT/JP2022/003480, dated Mar. 15, 2022.

* cited by examiner

*Primary Examiner* — Andrew T Piziali
(74) *Attorney, Agent, or Firm* — Birch, Stewart, Kolasch & Birch, LLP

(57) ABSTRACT

Provided is a technique that provides high durability and high flexibility at low temperatures.

A polyurethane resin composition is produced by chain-extending, using polyamine, a reaction product between a polyol including at least one polyether polyol of polytetramethylene ether glycol or polypropylene glycol, 1,10-decanediol, and a polyol including an anionic hydrophilic group, and polyisocyanate.

14 Claims, No Drawings

POLYURETHANE RESIN COMPOSITION, CURED PRODUCT, FIBER LAMINATE, AND ARTIFICIAL LEATHER

TECHNICAL FIELD

The present invention relates to a polyurethane resin composition, a cured product, a fiber laminate, and an artificial leather.

BACKGROUND ART

Aqueous polyurethane resin compositions, which can impart durability, have been used for leather-like sheets such as suede-like artificial leather (for example, Patent Literature 1).

Patent Literature 1 describes an aqueous-dispersion polycarbonate-based polyurethane resin composition produced by chain-extending, using a polyamine compound containing, in a single molecule, two or more amino groups of at least one selected from the group consisting of a primary amino group and a secondary amino group, a urethane prepolymer that is a reaction product between a polyol including a polycarbonatediol containing a structural unit derived from 1,10-decanediol and a polyhydric alcohol containing, as a functional group, a hydroxyl group alone and having a molecular weight of 400 or less, and an organic polyisocyanate, and that has, at an end, an isocyanate group.

CITATION LIST

Patent Literature

PTL 1: Japanese Unexamined Patent Application Publication No. 2017-119755

SUMMARY OF INVENTION

Technical Problem

However, the inventors of the present invention have found that the polyurethane resin described in PTL 1 undergoes degradation of the flexibility at low temperatures, which is problematic. Thus, development of a technique that provides high durability and high flexibility at low temperatures is desirable.

Solution to Problem

In order to address the problem, the present invention has been made and can be carried out as the following embodiments.

(1) An embodiment of the present invention provides a polyurethane resin composition. This polyurethane resin composition is produced by chain-extending, using polyamine, a reaction product between a polyol including at least one polyether polyol of polytetramethylene ether glycol or polypropylene glycol, 1,10-decanediol, and a polyol including an anionic hydrophilic group, and polyisocyanate.

The polyurethane resin composition according to this embodiment provides high durability and high flexibility at low temperatures.

(2) In the polyurethane resin composition according to such an embodiment, the polyether polyol may include polytetramethylene ether glycol.

The polyurethane resin composition according to this embodiment provides higher durability and higher flexibility at low temperatures.

(3) In the polyurethane resin composition according to such an embodiment, a formulation ratio of the polyether polyol to the polyol may be 60 mass % or more and 90 mass % or less.

The polyurethane resin composition according to this embodiment provides higher durability and higher flexibility at low temperatures.

(4) In the polyurethane resin composition according to such an embodiment, a formulation ratio of the 1,10-decanediol to the polyol may be 1 mass % or more and 30 mass % or less.

The polyurethane resin composition according to this embodiment provides higher durability and higher flexibility at low temperatures.

(5) In the polyurethane resin composition according to such an embodiment, the polyether polyol may have a number-average molecular weight of 500 or more and 2500 or less.

The polyurethane resin composition according to this embodiment provides higher durability and higher flexibility at low temperatures.

(6) Another embodiment of the present invention provides a cured product of the polyurethane resin composition according to such an embodiment.

(7) Another embodiment of the present invention provides a fiber laminate including a surface layer formed from the polyurethane resin composition according to such an embodiment, and a fiber fabric layer.

(8) Another embodiment of the present invention provides an artificial leather including the fiber laminate according to such an embodiment.

DESCRIPTION OF EMBODIMENTS

<Polyurethane Resin Composition>

A polyurethane resin composition according to an embodiment of the present invention is produced by chain-extending, using polyamine, a reaction product between a polyol and polyisocyanate. The polyol according to this embodiment includes at least one polyether polyol of polytetramethylene ether glycol (hereafter, also referred to as "PTMG") or polypropylene glycol (hereafter, also referred to as "PPG"), 1,10-decanediol, and a polyol including an anionic hydrophilic group. The polyurethane resin composition according to this embodiment can be present in the form of an aqueous dispersion.

The polyurethane resin composition according to this embodiment provides high durability and high flexibility at low temperatures. This mechanism has not been clarified but a possible mechanism is inferred that including 1,10-decanediol provides durability and including at least one polyether polyol of PTMG or PPG provides high flexibility at low temperatures.

<Polyol>

(Polytetramethylene Ether Glycol)

The polytetramethylene ether glycol (PTMG) according to this embodiment is not particularly limited; from the viewpoint of providing high flexibility at low temperatures, the number-average molecular weight of PTMG is, for example, preferably 500 or more, more preferably 800 or more, still more preferably 1500 or more, particularly preferably 1800 or more. On the other hand, from the viewpoint of providing high abrasion resistance, the number-average molecular weight of PTMG is, for example, preferably 3400 or less, more preferably 3000 or less, still more preferably 2500 or less, particularly preferably 2300 or less.
(Polypropylene Glycol)

The polypropylene glycol (PPG) according to this embodiment is not particularly limited; from the viewpoint of providing high flexibility at low temperatures, the number-average molecular weight of PPG is, for example, preferably 500 or more, more preferably 800 or more, still more preferably 1500 or more, particularly preferably 1800 or more. On the other hand, from the viewpoint of providing high abrasion resistance, the number-average molecular weight of PPG is, for example, preferably 3400 or less, more preferably 3000 or less, still more preferably 2500 or less, particularly preferably 2300 or less. As the polyether polyol, from the viewpoint of providing high durability and high flexibility at low temperatures, PTMG is preferably included.

As the polyether polyol, a polyether polyol other than polytetramethylene ether glycol (PTMG) and polypropylene glycol (PPG) may be further used. Such a polyether polyol is not particularly limited and examples include polyethylene glycol.

The number-average molecular weight of the polyether polyol is, for example, preferably 500 or more, more preferably 800 or more, still more preferably 1500 or more, particularly preferably 1800 or more. On the other hand, the number-average molecular weight of the polyether polyol is, for example, preferably 3400 or less, more preferably 3000 or less, still more preferably 2500 or less, particularly preferably 2300 or less.

The formulation ratio of the polyether polyol to the polyol is not particularly limited, and is, from the viewpoint of providing high abrasion resistance and high flexibility at low temperatures, preferably 50 mass % or more, more preferably 60 mass % or more, still more preferably 70 mass % or more, particularly preferably 78 mass % or more. On the other hand, the formulation ratio of the polyether polyol to the polyol is preferably 95 mass % or less, more preferably 90 mass % or less, still more preferably 88 mass % or less, particularly preferably 85 mass % or less.

The formulation ratio of 1,10-decanediol to the polyol is not particularly limited, and is, from the viewpoint of providing high abrasion resistance and high flexibility at low temperatures, preferably 1 mass % or more, more preferably 3 mass % or more, still more preferably 5 mass % or more, particularly preferably 8 mass % or more. On the other hand, the formulation ratio of 1,10-decanediol to the polyol is preferably 30 mass % or less, more preferably 20 mass % or less, still more preferably 18 mass % or less, particularly preferably 15 mass % or less.

The formulation ratio of the polyether polyol to 1,10-decanediol (polyether polyol/1,10-decanediol) is not particularly limited and is preferably 3 or more, more preferably 4 or more, still more preferably 5 or more, particularly preferably 6 or more. On the other hand, the formulation ratio of the polyether polyol to 1,10-decanediol (polyether polyol/1,10-decanediol) is preferably 20 or less, more preferably 15 or less, still more preferably 13 or less, particularly preferably 10 or less.

(Polyol Including Anionic Hydrophilic Group)

In this Description, the anionic hydrophilic group refers to a carboxy group or a salt thereof or a sulfonic group or a salt thereof.

Examples of the polyol including a carboxy group include carboxylic acid-containing compounds such as 2,2-dimethylolpropionic acid, 2,2-dimethylolbutyric acid, 2,2-dimethylolvaleric acid, dioxymaleic acid, 2,6-dioxybenzoic acid, and 3,4-diaminobenzoic acid, derivatives of the foregoing, salts of the foregoing, and polyester polyols formed from the foregoing.

Examples of the polyol including a sulfonic group include sulfonic acid-containing compounds such as 2-oxyethanesulfonic acid, phenolsulfonic acid, sulfobenzoic acid, sulfosuccinic acid, 5-sulfoisophthalic acid, sulfanilic acid, 1,3-phenylenediamine-4,6-disulfonic acid, and 2,4-diaminotoluene-5-sulfonic acid, derivatives of the foregoing, salts of the foregoing, and polyester polyols, polyamide polyols, and polyamide polyester polyols formed from the foregoing.

Such carboxy groups or sulfonic groups are neutralized into salts, to thereby provide high aqueous dispersibility of the finally obtained polyurethane, which is preferred. Examples of the neutralizer include nonvolatile bases such as sodium hydroxide and potassium hydroxide, tertiary amines such as trimethylamine, triethylamine, dimethylethanolamine, methyldiethanolamine, and triethanolamine, and volatile bases such as ammonia. The neutralization can be performed before, during, or after the urethane-forming reaction.

The polyol including an anionic hydrophilic group is, from the viewpoint of improving the storage stability of the polyurethane aqueous dispersion, preferably polyols including a carboxy group, more preferably 2,2-dimethylolpropionic acid.

<Polyisocyanate>

The polyisocyanate used for the polyurethane resin composition according to this embodiment is not particularly limited and examples include aliphatic polyisocyanates, alicyclic polyisocyanates, aromatic polyisocyanates, and aromatic-aliphatic polyisocyanates. From the viewpoint of providing high abrasion resistance and high flexibility at low temperatures, as the polyisocyanate, an alicyclic polyisocyanate is preferably included.

The aliphatic polyisocyanates are not particularly limited and examples include tetramethylene diisocyanate, dodecamethylene diisocyanate, hexamethylene diisocyanate (HDI), 2,2,4-trimethylhexamethylene diisocyanate, 2,4,4-trimethylhexamethylene diisocyanate, lysine diisocyanate, 2-methylpentane-1,5-diisocyanate, and 3-methylpentane-1,5-diisocyanate.

The alicyclic polyisocyanates are not particularly limited and examples include isophorone diisocyanate (IPDI), hydrogenated xylylene diisocyanate, 4,4'-dicyclohexylmethane diisocyanate, 1,4-cyclohexane diisocyanate, methylcyclohexylene diisocyanate, and 1,3-bis(isocyanatomethyl)cyclohexane.

The aromatic polyisocyanates are not particularly limited and examples include tolylene diisocyanate (TDI), 2,2'-diphenylmethane diisocyanate, 2,4'-diphenylmethane diisocyanate, 4,4'-diphenylmethane diisocyanate (MDI), polymethylene polyphenyl polyisocyanate, 4,4'-dibenzyl diisocyanate, 1,5-naphthylene diisocyanate, xylylene diisocyanate, 1,3-phenylene diisocyanate, and 1,4-phenylene diisocyanate.

The aromatic-aliphatic polyisocyanates are not particularly limited and examples include dialkyldiphenylmethane diisocyanate, tetraalkyldiphenylmethane diisocyanate, and α,α,α,α-tetramethylxylylene diisocyanate.

As the polyisocyanate, modified products of the above-described organic polyisocyanates may be used. Such modified products of the organic polyisocyanates are not particularly limited and examples include carbodiimides, allophanates, biurets, isocyanurates, and adducts. Note that such polyisocyanates can be used alone or in combination of two or more thereof.

From the viewpoint of providing high abrasion resistance and high flexibility at low temperatures, the polyisocyanate is preferably isophorone diisocyanate (IPDI).

The average molecular weight of the polyisocyanate is not particularly limited, and is preferably 100 or more and 400 or less, more preferably 120 or more and 300 or less, more preferably 150 or more and 280 or less.

<Polyamine>

The polyamine used for the polyurethane resin composition according to this embodiment is not particularly limited and examples include chain extenders ordinarily used in the technical field. Examples of the polyamine include diamines, triamines, and tetramines. Examples of the diamines include ethylenediamine, trimethylenediamine, piperazine, and isophoronediamine. Examples of the triamines include diethylenetriamine and dipropylenetriamine. Examples of the tetramines include triethylenetetramine.

<Others>

The polyurethane resin composition according to this embodiment may include other materials as long as they do not impair advantages of the present invention. The other materials are not particularly limited and examples include chain extenders, crosslinking agents, and catalysts.

The chain extenders are not particularly limited and examples include ethylene glycol, diethylene glycol, 1,4-butanediol, 1,3-butanediol, 2,3-butanediol, 1,3-propylene glycol, 1,2-propylene glycol, 1,6-hexanediol, 3-methyl-1,5-pentanediol, and neopentyl glycol. The crosslinking agents are not particularly limited and examples include aminoplast compounds, epoxy compounds, carbodiimide compounds, and glycerol.

The catalysts are not particularly limited and examples include metallic catalysts and amine-based catalysts. The metallic catalysts are not particularly limited and examples include tin catalysts such as dibutyl tin dilaurate, dioctyl tin dilaurate, and dibutyl tin dioctate, lead catalysts such as lead octylate, lead octenoate, and lead naphthenate, and bismuth catalysts such as bismuth octylate and bismuth neodecanoate. The amine-based catalysts are not particularly limited and examples include tertiary amine compounds such as triethylenediamine.

<Production Method>

The polyurethane resin composition is not particularly limited in terms of the production method and can be produced by publicly known methods. For example, first, at least one polyether polyol of polytetramethylene ether glycol or polypropylene glycol, 1,10-decanediol, the above-described polyol including an anionic hydrophilic group, and polyisocyanate are caused to react, to thereby synthesize an isocyanate-terminated urethane prepolymer. This reaction is performed without solvents or in an organic solvent not having active hydrogen groups. Subsequently, as needed, the anionic hydrophilic group is neutralized and then dispersion-emulsification is performed in water. Subsequently, a small equivalent of a chain extender relative to the remaining isocyanate groups in the urethane prepolymer (for example, an equivalent ratio of isocyanate groups to amino groups in the chain extender=1:0.5 to 0.95) is added, and subsequently an interfacial polymerization reaction is caused between the chain extender and isocyanate groups within emulsification micelles, to thereby form urea bonds. This reaction causes polymerization within emulsification micelles, to provide a polyurethane resin aqueous dispersion. Subsequently, as needed, the used solvent is removed, to thereby obtain an aqueous dispersion of the polyurethane resin composition. In this method, the equivalent ratio of the isocyanate groups of the polyisocyanate to the total of the hydroxy groups of the polyol and the amino groups of the chain extender is preferably 1:0.85 to 1.1.

In the case of dispersion emulsification of the isocyanate-terminated urethane prepolymer in water, a surfactant may be used as an emulsifier. The surfactant is not particularly limited and examples include nonionic surfactants, anionic surfactants, and cationic surfactants. Such surfactants may be used alone or in combination of two or more thereof.

The nonionic surfactants are not particularly limited and examples include alcohols having 8 to 24 carbon atoms, alkenols having 8 to 24 carbon atoms, polycyclic phenols, amines having 8 to 44 carbon atoms, amides having 8 to 44 carbon atoms, fatty acids having 8 to 24 carbon atoms, fatty acid esters of polyhydric alcohols, fats and oils, alkylene oxide adducts of polypropylene glycol, alkylene oxide adducts of polycyclic phenols, and PLURONIC (registered trademark) nonionic surfactants. The alkylene oxide adducts of polycyclic phenols are not particularly limited and examples include polyoxyethylene distyrylphenyl ether-based nonionic surfactants, polyoxyethylene polyoxypropylene distyrylphenyl ether-based nonionic surfactants, polyoxyethylene tristyrylphenyl ether-based nonionic surfactants, and polyoxyethylene polyoxypropylene tristyrylphenyl ether-based nonionic surfactants. When two or more alkylene oxides are added to such a nonionic surfactant, such addition may be block addition or random addition.

The anionic surfactants are not particularly limited and examples include alcohols, alkenols, and anionized products of alkylene oxide adducts of the above-described nonionic surfactants.

The cationic surfactants are not particularly limited and examples include monoalkyltrimethyl ammonium salts having 8 to 24 carbon atoms, dialkyldimethyl ammonium salts having 8 to 24 carbon atoms, monoalkylamine acetates having 8 to 24 carbon atoms, dialkylamine acetates having 8 to 24 carbon atoms, and alkylimidazoline quaternary salts having 8 to 24 carbon atoms.

As the surfactant, from the viewpoint of having high compatibility with other components, preferred are nonionic surfactants and more preferred are alkylene oxide adducts of polycyclic phenols and PLURONIC (registered trademark) nonionic surfactants.

The amount of surfactant used is, relative to 100 parts by mass of the solid content of the isocyanate-terminated urethane prepolymer, preferably 0.5 parts by mass or more, more preferably 2 parts by mass or more, or preferably 10 parts by mass or less, more preferably 8 parts by mass or less. When the amount of surfactant used is in such a range, a polyurethane resin composition that provides higher abrasion resistance and higher flexibility at low temperatures can be obtained.

The molecular weight of the polyurethane resin composition is not particularly limited; for example, the weight-average molecular weight is preferably 5000 to 500000, more preferably 10000 to 300000. The weight-average molecular weight is measured using a GPC apparatus using tetrahydrofuran (THF) as the solvent and is determined as a polystyrene-equivalent value. Specific measurement conditions are as follows.

Columns: polystyrene gel columns manufactured by Tosoh Corporation (TSK gel G4000HXL+TSK gel G3000HXL+TSK gel G2000HXL+two TSK gel G1000HXL are connected in series in this order)

Column temperature: 40° C.

Detector: differential refractive index detector (manufactured by SHIMADZU CORPORATION, RID-6A)

Flow rate: 1 ml/min

The acid value of the polyurethane resin composition is not particularly limited and is, for example, preferably 0.1 mgKOH/g to 20 mgKOH/g, more preferably 0.3 mgKOH/g to 15 mgKOH/g. Such acid values used herein refer to acid values measured in accordance with JIS K0070-1992.

The polyurethane resin composition according to this embodiment provides high abrasion resistance and high flexibility at low temperatures and hence is effectively applicable to artificial leathers, for example. The method of using the polyurethane resin composition according to this embodiment to produce an artificial leather is not particularly limited and existing methods can be used. For example, the polyurethane resin composition is applied to a release paper sheet and subsequently subjected to evaporation of water to thereby form a surface layer; this surface layer is coated with an adhesive, subsequently bonded to a fiber fabric layer, and subjected to evaporation of water, to thereby produce an artificial leather. This method is a method for producing a fiber laminate including a surface layer formed from the polyurethane resin composition according to this embodiment and a fiber fabric layer, and this fiber laminate corresponds to an artificial leather. The obtained artificial leather is used for, for example, vehicles, furniture, clothing, shoes, bags, pouches, sandals, and sundry goods. The artificial leather may further include, in addition to the surface layer and the fiber fabric layer, another layer (for example, a metallic layer). The adhesive used in the method is not particularly limited as long as it bonds together the surface layer and the fiber base member and examples include polyurethane adhesives. The polyurethane resin composition according to this embodiment can be dried to thereby provide a cured product. The cured product and the fiber laminate obtained in this embodiment may further be subjected to post-processing such as surface treatment and boarding.

EXAMPLES

Hereinafter, the present invention will be described further in detail with reference to Examples; however, the present invention is not limited to the following Examples. Note that, in the following Examples and Comparative Examples, "parts" are based on mass unless otherwise specified.

<Reagents Used>
(i) Polyol
(PTMG)

PolyTHF (registered trademark) 2000 (manufactured by Mitsubishi Chemical Corporation) (number of functional groups: 2, number-average molecular weight: 2000)

PolyTHF (registered trademark) 1000 (manufactured by Mitsubishi Chemical Corporation) (number of functional groups: 2, number-average molecular weight: 1000)

PolyTHF (registered trademark) 3000 (manufactured by Mitsubishi Chemical Corporation) (number of functional groups: 2, number-average molecular weight: 3000) (PPG)

EXCENOL 2020 (manufactured by Asahi Glass Co., Ltd.) (number of functional groups: 2, number-average molecular weight: 2000) (Decanediol)

1,10-Decanediol (manufactured by HOKOKU CORPORATION) (number of functional groups: 2, number-average molecular weight: 174.28) (Polyol including anionic hydrophilic group)

Dimethylolpropionic acid (manufactured by Perstorp, Bis-MPA (registered trademark)) (number of functional groups: 2, number-average molecular weight: 134.13) (Other polyol)

DURANOL (registered trademark) T4672 (manufactured by Asahi Kasei Corporation) (number of functional groups: 2, number-average molecular weight: 2000)

NIPPOLAN 4010 (manufactured by Tosoh Corporation) (number of functional groups: 2, number-average molecular weight: 2000)

TL TA22-781 (manufactured by Hitachi Chemical Company, Ltd.) (number of functional groups: 2, number-average molecular weight: 1780)

Polyethylene glycol (manufactured by DAI-ICHI KOGYO SEIYAKU CO., LTD., PEG-2000) (number of functional groups: 2, number-average molecular weight: 2000)

Trimethylolpropane (manufactured by MITSUBISHI GAS CHEMICAL COMPANY, INC.) (number of functional groups: 3, number-average molecular weight: 134.17)

Polyethylene glycol (manufactured by DAI-ICHI KOGYO SEIYAKU CO., LTD., PEG-600S) (number of functional groups: 2, number-average molecular weight: 600) (Polyisocyanate)

IPDI (VESTANAT (registered trademark) IPDI (manufactured by Evonik Industries)) (number of functional groups: 2, number-average molecular weight: 222.29) (Others)

Triethylamine (manufactured by Daicel Corporation) (number-average molecular weight: 101.19)

Isophoronediamine (VESTAMIN (registered trademark) IPD (manufactured by Evonik Industries))

EXAMPLES

Polyurethane resin compositions of Examples and Comparative Examples were produced in accordance with formulations (parts by mass) described in Table below.

<Synthesis of Polyurethane Aqueous Dispersion>

Example 1

PTMG, 1,10-decanediol, trimethylolpropane, IPDI, dimethylolpropionic acid, polyethylene glycol (manufactured by DAI-ICHI KOGYO SEIYAKU CO., LTD., PEG-600S), and methyl ethyl ketone were mixed together and caused to react at 70 to 75° C. for 120 minutes. At this time, the free isocyanate group content (in terms of solid content) was 1.8 mass %. The prepolymer was cooled to 35° C. and neutralized by adding triethylamine. Subsequently, while water was gradually added to this solution, a homogenizer was used to achieve emulsification. To the resultant emulsification dispersion, an aqueous solution in which isophoronediamine was dissolved was added; after disappearance of free isocyanate groups was confirmed, methyl ethyl ketone was distilled off to provide an aqueous dispersion of a polyurethane resin composition having a solid content of 40 mass % and an acid value of 6.3 mgKOH/g.

<Production of Film>

The obtained aqueous dispersion of the polyurethane resin composition was cast on a release paper sheet so as to have a dry film thickness of 200 µm and subsequently dried at 80° C. for 6 hours, to thereby produce a film.

<Evaluation of Flexibility>

The obtained film was cut into a predetermined size. The resultant sample was subjected to, in accordance with JIS K 6301, tension at a tensile speed of 200 mm/min to a predetermined elongation, at which time the stress (100% modulus) was measured. The evaluation of flexibility was performed three times: immediately after preparation of the sample, after storage at 5° C. for 2 weeks, and after storage at 5° C. for 4 weeks. The lower the stress, the higher the flexibility.

For the flexibility, evaluation was performed in the following manner.

A: 5.0 MPa or less
B: more than 5.0 MPa and 8.0 MPa or less
C: more than 8.0 MPa and 10.0 MPa or less
D: more than 10.0 MPa <Abrasion Resistance>

A plane abrasion tester (manufactured by DAIEI KAGAKU SEIKI MFG. CO., LTD., PA-300A) was used to rub, under a load of 500 g/cm2 at 60 times/min, the surface of the obtained film 2000 times and whether or not scratching occurred was visually observed. The less the occurrence of scratching or separation, the higher the abrasion resistance.

For the abrasion resistance, evaluation was performed in the following manner.

A: no scratching or separation occurred at 2000 rubbing times
B: scratching or separation occurred at 1000 rubbing times or more and less than 2000 rubbing times
C: scratching or separation occurred at less than 1000 rubbing times The results in Table have demonstrated the following. Examples including at least one polyether polyol of polytetramethylene ether glycol or polypropylene glycol and 1,10-decanediol have been demonstrated to provide high abrasion resistance and high flexibility at low temperatures, compared with Comparative Example 1 not including 1,10-decanediol and Comparative Examples 2-5 not including polytetramethylene ether glycol or polypropylene glycol.

The present invention is not limited to the above-described embodiments and can be carried out in various embodiments without departing from the spirit and scope thereof. For example, technical features in embodiments and Examples corresponding to technical features in embodiments in Summary of Invention can be appropriately replaced or combined in order to achieve a portion of or the entirety of the above-described object or in order to provide a portion of or the entirety of the above-described advantages. As long as such technical features are not described as essential features in this Description, the features can be appropriately removed.

The invention claimed is:

1. A polyurethane resin composition produced by chain-extending, using polyamine, a reaction product between
   a polyol including at least one polyether polyol of polytetramethylene ether glycol or polypropylene glycol, 1,10-decanediol, and a polyol including an anionic hydrophilic group, and
   polyisocyanate.

2. The polyurethane resin composition according to claim 1,
   wherein the polyether polyol includes polytetramethylene ether glycol.

3. The polyurethane resin composition according to claim 1,
   wherein a formulation ratio of the polyether polyol to the polyol is 60 mass % or more and 90 mass % or less.

TABLE 1

| | Composition | Number of functional groups | Molecular weight | Example 1 | Example 2 | Example 3 | Example 4 | Comparative Example 1 | Comparative Example 2 | Comparative Example 3 | Comparative Example 4 | Comparative Example 5 |
|---|---|---|---|---|---|---|---|---|---|---|---|---|
| PTMG | POLYTHF2000 | 2 | 2000 | 60 | | | | 60 | | | | |
| PPG | EXCENOL 2020 | 2 | 2000 | | 60 | | | | | | | |
| PTMG | POLYTHF1000 | 2 | 1000 | | | 62 | | | | | | |
| PTMG | POLYTHF3000 | 2 | 3000 | | | | 53.6 | | | | | |
| | 1,10-Decanediol | 2 | 174.28 | 8 | 8 | 4 | 12 | | 8 | 8 | 8 | 8 |
| | Polyisocyanate | 2 | 222.29 | 26 | 26 | 28 | 28.4 | 27.2 | 26 | 26 | 26 | 26 |
| Other polyol | DURANOL T4672 | 2 | 2000 | | | | | 60 | | | | |
| | NIPPOLAN 4010 | 2 | 2000 | | | | | | 60 | | | |
| | TA22-781 | 2 | 1780 | | | | | | | 60 | | |
| | PEG-2000 | 2 | 2000 | | | | | | | | 60 | |
| | Trimethylolpropane | 3 | 134.17 | 0.5 | 0.5 | 0.5 | 0.5 | 0.5 | 0.5 | 0.5 | 0.5 | 0.5 |
| | Bis-MPA | 2 | 134.13 | 1.5 | 1.5 | 1.5 | 1.5 | 8.3 | 1.5 | 1.5 | 1.5 | 1.5 |
| | PEG 600S | 2 | 600 | 4 | 4 | 4 | 4 | 4 | 4 | 4 | 4 | 4 |
| | Total | | | 100 | 100 | 100 | 100 | 100 | 100 | 100 | 100 | 100 |
| | Polyether polyol content (parts by mass/entirety of polyol) | | | 81.1 | 81.1 | 86.1 | 74.9 | 82.4 | 0.0 | 0.0 | 0.0 | 81.1 |
| | 1,10-Decanediol content (parts by mass/entirety of polyol) | | | 10.8 | 10.8 | 5.6 | 16.8 | 0.0 | 10.8 | 10.8 | 10.8 | 10.8 |
| | Triethylamine | | 101.19 | 1 | 1 | 1 | 1 | 1 | 1 | 1 | 1 | 1 |
| | Isophoronediamine | 2 | | 3 | 3 | 3 | 3 | 3 | 3 | 3 | 3 | 3 |
| | Water | | | 200 | 200 | 200 | 200 | 200 | 200 | 200 | 200 | 200 |
| Evaluation | Flexibility | | Initial state | A | A | A | A | B | C | C | C | A |
| | | | 5° C. × 2 weeks | A | A | A | A | C | C | C | C | C |
| | | | 5° C. × 4 weeks | A | A | B | A | C | C | C | C | C |
| | | | Abrasion resistance | A | A | A | B | A | A | A | A | C |

4. The polyurethane resin composition according to claim 1,
   wherein a formulation ratio of the 1,10-decanediol to the polyol is 1 mass % or more and 30 mass % or less.

5. The polyurethane resin composition according to claim 1,
   wherein the polyether polyol has a number-average molecular weight of 500 or more and 2500 or less.

6. A cured product of the polyurethane resin composition according to claim 1.

7. A fiber laminate comprising a surface layer formed from the polyurethane resin composition according to claim 1, and a fiber fabric layer.

8. An artificial leather comprising the fiber laminate according to claim 7.

9. The polyurethane resin composition according to claim 2,
   wherein a formulation ratio of the polyether polyol to the polyol is 60 mass % or more and 90 mass % or less.

10. The polyurethane resin composition according to claim 2,
    wherein a formulation ratio of the 1,10-decanediol to the polyol is 1 mass % or more and 30 mass % or less.

11. The polyurethane resin composition according to claim 2,
    wherein the polyether polyol has a number-average molecular weight of 500 or more and 2500 or less.

12. A cured product of the polyurethane resin composition according to claim 2.

13. A fiber laminate comprising a surface layer formed from the polyurethane resin composition according to claim 2, and a fiber fabric layer.

14. An artificial leather comprising the fiber laminate according to claim 13.

* * * * *